United States Patent
Cunningham et al.

(10) Patent No.: US 8,925,531 B2
(45) Date of Patent: Jan. 6, 2015

(54) SPARK PLUG DEGRADATION DETECTION

(71) Applicant: Ford Global Technologies, LLC, Dearborn, MI (US)

(72) Inventors: Ralph Wayne Cunningham, Milan, MI (US); Michael Joseph Zaitz, Charleston, SC (US); Ken Jahr, West Bloomfield, MI (US); Chris Paul Glugla, Macomb, MI (US); Robert Sarow Baskins, Grass Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/158,950

(22) Filed: Jan. 20, 2014

(65) Prior Publication Data

US 2014/0136081 A1    May 15, 2014

Related U.S. Application Data

(62) Division of application No. 13/028,872, filed on Feb. 16, 2011, now Pat. No. 8,683,976.

(51) Int. Cl.
| F02P 1/00 | (2006.01) |
|---|---|
| F02D 35/02 | (2006.01) |
| F02D 41/00 | (2006.01) |
| F02D 41/22 | (2006.01) |
| F02P 17/00 | (2006.01) |
| F02D 17/02 | (2006.01) |
| F02D 41/26 | (2006.01) |
| F02D 41/14 | (2006.01) |

(52) U.S. Cl.
CPC .............. *F02D 35/02* (2013.01); *F02D 41/008* (2013.01); *F02D 41/221* (2013.01); *F02P 17/00* (2013.01); *F02D 17/02* (2013.01); *F02D 41/26* (2013.01); *F02D 35/021* (2013.01); *F02D 35/027* (2013.01); *F02D 41/0087* (2013.01); *F02D 41/1454* (2013.01); *F02D 41/1498* (2013.01); *F02D 2041/228* (2013.01); *F02D 2200/1015* (2013.01); *F02D 2250/26* (2013.01); *Y02T 10/40* (2013.01)
USPC .................... 123/594; 123/169 R; 73/114.62; 313/118

(58) Field of Classification Search
CPC ................................... F02P 2017/123
USPC .............. 123/594, 143 R, 169 R; 73/114.62; 313/118
See application file for complete search history.

(56) References Cited

U.S. PATENT DOCUMENTS

| 5,905,193 A | 5/1999 | Hashizume et al. |
| 6,105,552 A | 8/2000 | Arisawa et al. |
| 7,128,048 B2 | 10/2006 | Yamoaka et al. |

(Continued)

*Primary Examiner* — John Kwon
(74) *Attorney, Agent, or Firm* — Julia Voutyras; Alleman Hall McCoy Russell & Tuttle LLP

(57) ABSTRACT

Methods and systems are provided for identifying and indicating degradation of an engine cylinder spark plug. In response to a cylinder misfire event during selected engine operating conditions, followed by an occurrence of a threshold number and/or rate of pre-ignition events in the same cylinder, a controller may determine that the spark plug is degraded. The controller may limit combustion in the cylinder in response to the degradation. Additionally, cylinder pre-ignition mitigating steps may be taken.

14 Claims, 3 Drawing Sheets

(56) References Cited

U.S. PATENT DOCUMENTS

| | | |
|---|---|---|
| 7,673,614 B2 | 3/2010 | Inada et al. |
| 8,073,613 B2 | 12/2011 | Rollinger et al. |
| 8,265,859 B2 | 9/2012 | Rollinger et al. |
| 8,447,502 B2 | 5/2013 | Rollinger et al. |
| 8,683,976 B2 * | 4/2014 | Cunningham et al. ........ 123/434 |
| 2006/0042355 A1 * | 3/2006 | Zhu et al. ..................... 73/35.08 |
| 2009/0308146 A1 | 12/2009 | Gautrot et al. |
| 2013/0139786 A1 * | 6/2013 | Glugla et al. ................. 123/321 |

* cited by examiner

SPARK PLUG DEGRADATION DETECTION

CROSS REFERENCE TO RELATED APPLICATIONS

The present application is a divisional of U.S. patent application Ser. No. 13/028,872, entitled "SPARK PLUG DEGRADATION DETECTION," filed on Feb. 16, 2011, the entire contents of which are hereby incorporated by reference for all purposes.

FIELD

The present description relates generally to methods and systems for detecting degradation in an engine cylinder spark plug.

BACKGROUND/SUMMARY

Under certain operating conditions, engines that have high compression ratios, or are boosted to increase specific output, may be prone to low speed pre-ignition combustion events. The early combustion due to pre-ignition can cause high in-cylinder pressures, and can result in combustion pressure waves similar to combustion knock, but with larger intensity.

One example approach for identifying pre-ignition is illustrated by Inada et al. in U.S. Pat. No. 7,673,614. Therein, cylinder pre-ignition is detected based on ion currents and leakage currents across the spark plug. The method separately detects spark plug smoldering, again based on ion currents and leakage currents across the spark plug. Specifically, different profiles of the ion current/leakage current are used to identify either pre-ignition or spark plug smoldering.

However, the inventors herein have recognized that in some instances, pre-ignition is caused by a degraded spark plug. As such, the above approach can potentially provide inaccurate results indicating that pre-ignition has occurred (e.g., due to excessive boost), whereas the true culprit is a degraded spark plug. Additionally, the inaccurate results can lead to inaccurate mitigating steps being taken, that can potentially damage the engine.

In one example, some of the above issues may be addressed by a method of controlling an engine cylinder including a spark plug. One example embodiment comprises, indicating spark plug degradation in a cylinder based on each of misfire and pre-ignition in the cylinder. For example, the indication of degradation may be based on an occurrence of misfire in the cylinder and an occurrence of a number of pre-ignition events in that cylinder occurring within a threshold duration.

In this way, it is possible to distinguish pre-ignition due to excessive boost or compression ratio, from pre-ignition due to spark plug degradation. Specifically, by correlating the cylinder's misfire history with the cylinder's pre-ignition history, it is possible to reliably identify pre-ignition induced by spark plug degradation and mitigating actions can be taken in accordance. For example, by limiting combustion in a cylinder having a degraded spark plug, especially at high engine loads, further cylinder pre-ignition events may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
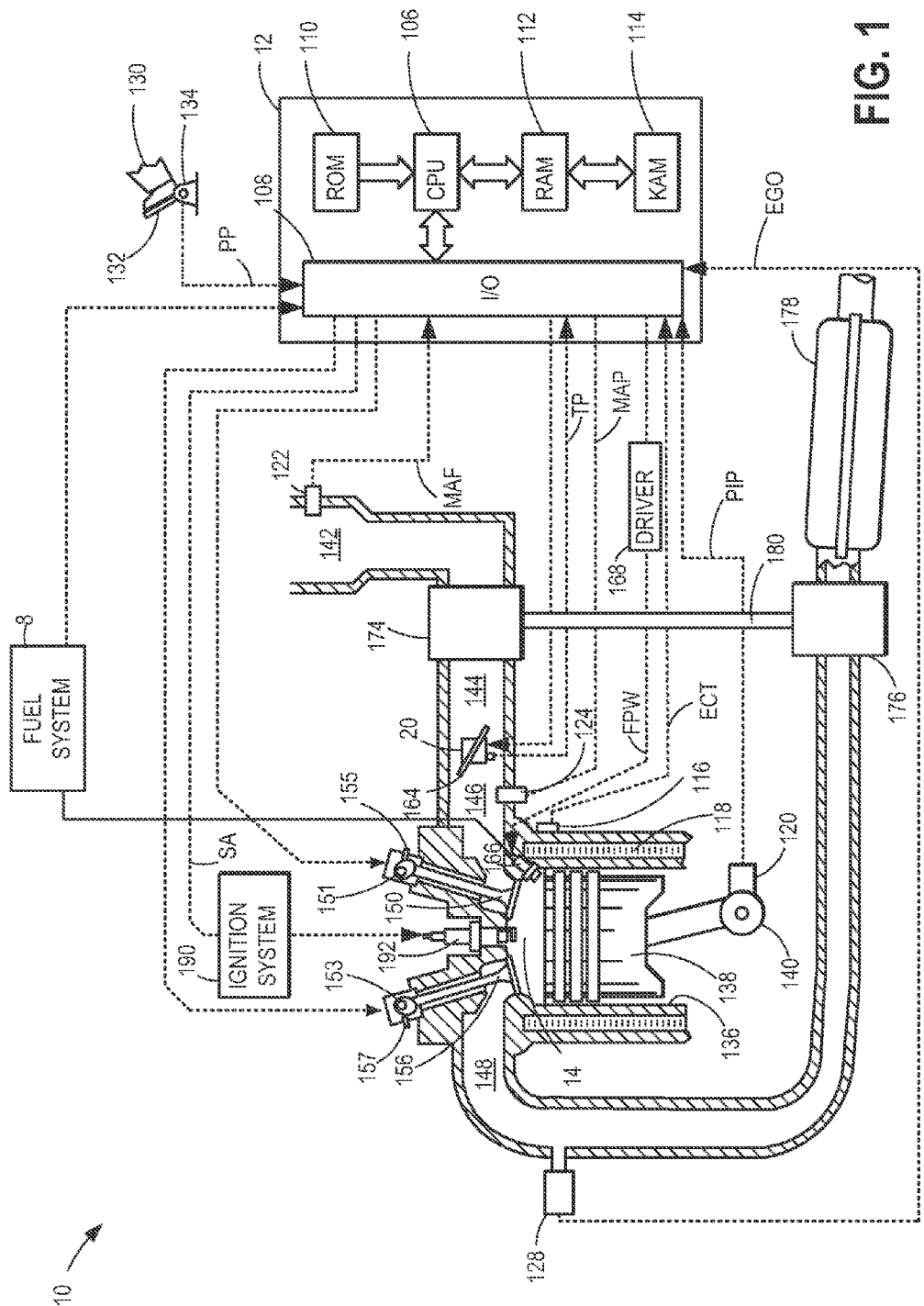
FIG. 1 shows an example combustion chamber.

The following description relates to systems and methods for indicating cylinder spark plug degradation, such as in the combustion chamber of FIG. 1. As elaborated herein with reference to FIG. 2, an engine controller may indicate spark plug degradation based on each of the occurrence of a cylinder misfire event and a cylinder pre-ignition event. In particular, in response to a cylinder misfire count exceeding a threshold during selected engine operating conditions, and a cylinder pre-ignition count exceeding a threshold following the misfire event, the controller may indicate spark plug degradation in that cylinder. To reduce engine damage from further pre-ignition events, the engine controller may limit combustion in the cylinder at high engine loads, and take pre-ignition mitigating actions, such as temporary cylinder fuel enrichment, as elaborated in FIG. 3. In this way, spark plug degradation induced pre-ignition may be identified and differentiated from non-spark plug degradation induced pre-ignition, and accordingly addressed.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. Degradation of spark plug 162 can lead to misfires in combustion chamber 14. As such, if unattended, the degraded spark plug can also lead to an increased occurrence of cylinder pre-ignition combustion events. Spark plug degradation may include, for example, spark plug wire degradation (e.g., loose wire, shorted wire), electrode degradation (e.g., worn out electrodes), spark plug fouling or smoldering, etc.

Figure 2:
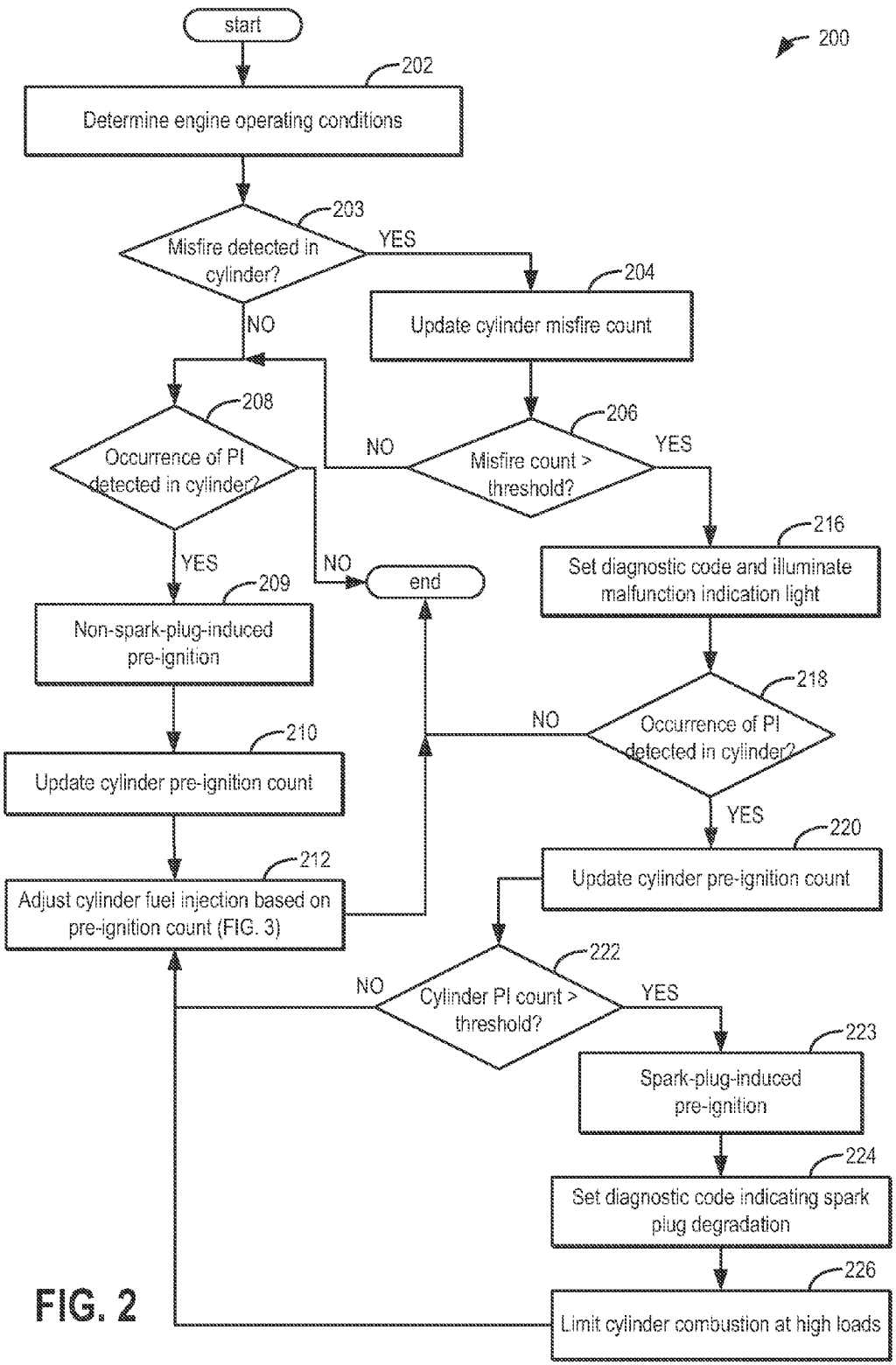
FIG. 2 shows a high level flow chart for indicating cylinder spark plug degradation in response to each of a cylinder misfire event and a cylinder pre-ignition event.
Figure 3:
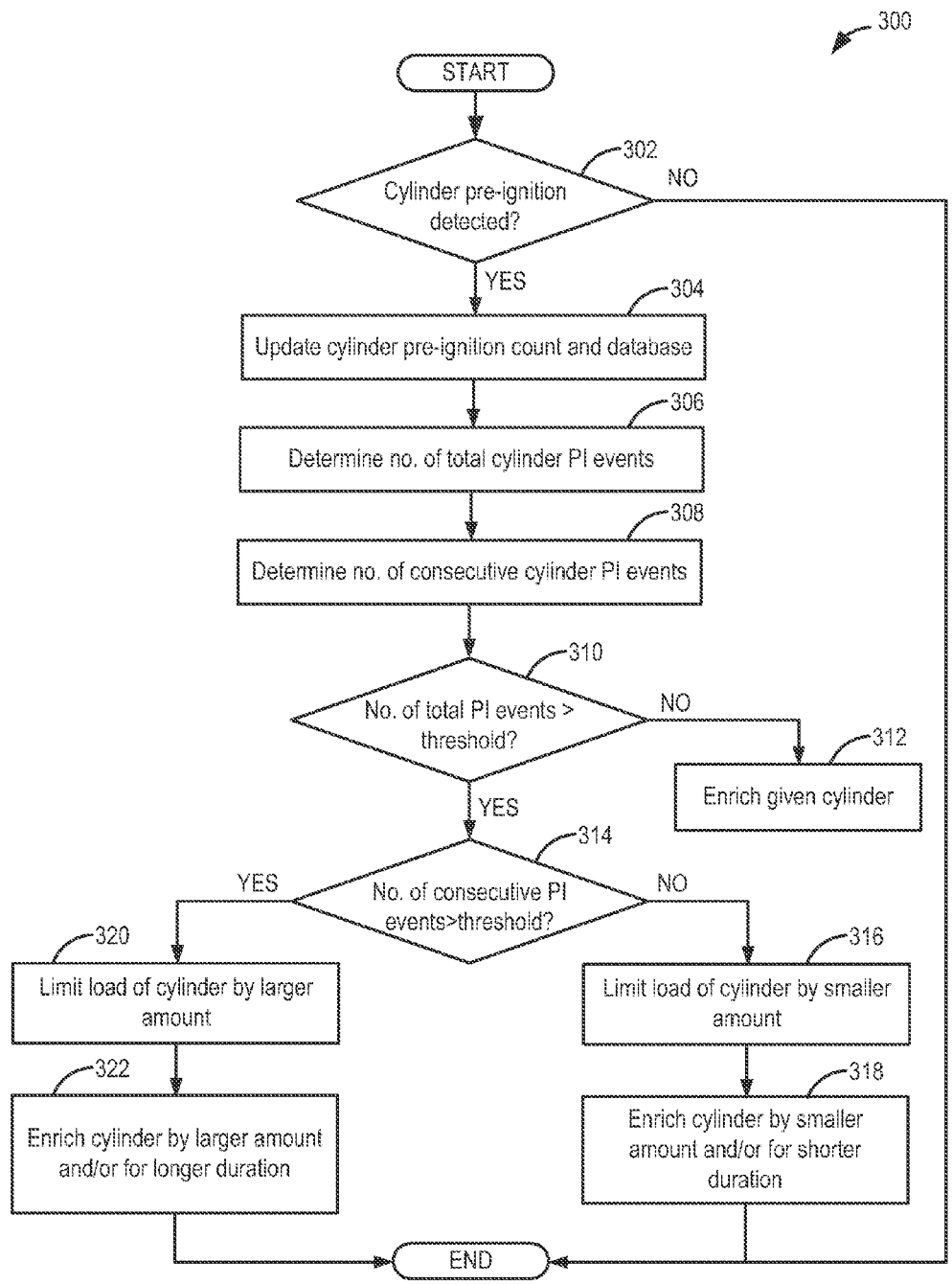
FIG. 3 shows a high level flow chart for mitigating cylinder pre-ignition events.

As elaborated with reference to FIGS. 2-3, an engine controller may monitor a cylinder's misfire history or count (such as, a number of cylinder misfires within a defined duration during selected engine operating conditions), and the same cylinder's pre-ignition history or count (such as, a number and/or rate of cylinder pre-ignition events within a defined duration since a preceding misfire event) to identify and address spark plug degradation, and adjust a cylinder fuel injection and load limiting accordingly. In particular, in response to an occurrence of a threshold number and/or rate of pre-ignition events in the cylinder following a cylinder misfire event during select engine operating conditions, the controller may indicate that the spark plug is degraded and limit combustion in the cylinder at high engine loads. The controller may also adjust a fuel injection in the cylinder for a defined number of subsequent combustion events, to enrich the cylinder and mitigate the pre-ignition.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Now turning to FIG. 2, an example routine 200 is described for indicating spark plug degradation in a cylinder based on each of misfire and pre-ignition in the cylinder. As such, the routine of FIG. 2 is illustrated with reference to a single cylinder of the engine and may be similarly performed for each cylinder of the engine.

At 202, engine operating conditions may be determined. These may include, for example, engine speed, torque, engine load, engine temperature, engine manifold pressure, air temperature, etc. At 203, it may be determined whether a misfire has been detected in the cylinder. In one example, the cylinder misfire is based on crankshaft acceleration. In another example, the cylinder misfire is based on an exhaust air-fuel ratio, for example, based on the output of an exhaust gas oxygen sensor (e.g., UEGO sensor). In still another example, the cylinder misfire is based on spark plug ionization (e.g., ionization current) as determined by an ionization sensor coupled to the spark plug. If a cylinder misfire event is not determined, then the routine may proceed to 208 to determine whether a cylinder pre-ignition event has occurred. In one example, cylinder pre-ignition may be identified based on information from one or more knock sensors, as further elaborated below. If a cylinder misfire event is determined at 203, then at 204, a cylinder misfire count for the given cylinder may be updated.

It will be appreciated that in one embodiment of routine 200, not all cylinder misfire events may be considered in the evaluation of spark plug degradation. That is, different misfire events may be weighed differently for the purpose of spark plug degradation, the weight of the misfire event based on the engine operating conditions during which they occur. For example, misfire events occurring during engine cold start conditions (such as, misfire events occurring before a catalyst temperature reaches a threshold, misfire events occurring within a threshold duration since a key-on event, misfire events occurring before a predefined engine speed is reached, etc.) may be weighed more in the determination and indication of spark plug degradation, while misfire events occurring during engine running conditions may be weighed less. In alternate examples, all cylinder misfire events may be considered.

At 206, it may be determined whether the updated misfire count is greater than a threshold. For example, the routine may confirm the occurrence of a number of misfires in the engine cylinder during selected engine operating conditions, such as engine cold-start conditions. In some embodiments, the routine may further determine a rate of misfire, for example, whether a number of misfires have occurred in the engine cylinder during the selected engine operating conditions within a threshold duration. The threshold duration may include a threshold number of combustion events (such as, a threshold number of combustion events since an engine-on, or a vehicle key-on event). In another example, the threshold duration may include a threshold amount of time (such as, an amount of time required for an exhaust catalytic converter to reach a light-off temperature).

If no misfire is detected at 203, or if the updated misfire count is not greater than the threshold count at 206, then the routine may continue to 208 to confirm the occurrence of a pre-ignition event in that cylinder, for example, based on the output of one or more engine knock sensors (as elaborated below). In comparison, if the number and/or rate of misfires, as determined in the updated misfire count, is greater than the threshold, then at 216, a diagnostic code may be set and a malfunction indication light may be illuminated to indicate the sufficiently high occurrence of misfires. Additionally, the affected cylinder may not be fueled for a defined duration. After setting the diagnostic code for the high misfire count, the routine may proceed to 218 to confirm the occurrence of a pre-ignition event in that cylinder.

In one example, at 208 and 218, the detection of pre-ignition may involve sensing abnormal combustion events and differentiating abnormal combustion events due to knocking from those indicative of pre-ignition. For example, input from an in-cylinder knock sensor and/or a crankshaft acceleration sensor may be used to indicate an abnormal combustion event in the cylinder. The knock sensor may be an accelerometer on the engine block, or an ionization sensor configured in the spark plug of each cylinder. Based on the knock sensor signal, such as a signal timing, amplitude, intensity, frequency, etc., and/or based on the crankshaft acceleration signal, the controller may identify pre-ignition. For example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows. Additionally, pre-ignition may be distinguished from knock based on the engine operating conditions at the time of abnormal combustion detection. For example, abnormal combustion detected at higher engine speeds and loads may be attributed to knocking while those at lower engine speeds and loads may be indicative of pre-ignition. As such, mitigating actions taken to address knock may differ from those taken by the controller to address pre-ignition. For example, knock may be addressed using spark retard and EGR. Pre-ignition addressing actions are further elaborated herein with reference to FIG. 3.

If no misfire was detected at 203, or a lower than threshold number of cylinder misfire events are determined at 206, and this is followed by no occurrence of a cylinder pre-ignition event at 208, the routine may end. In comparison, if a cylinder pre-ignition event does occur at 208, then at 209, non-spark-plug-induced pre-ignition may be determined, and at 210, the cylinder pre-ignition count may be updated. At 212, a cylinder fuel injection may be adjusted based on the updated pre-ignition count. As elaborated in FIG. 3, in response to the occurrence of cylinder pre-ignition (and/or the occurrence of a threshold number of pre-ignition events), the given cylinder may be enriched for a duration to reduce the occurrence of further pre-ignition events, the enrichment and/or the duration adjusted based on the pre-ignition count. Additionally, or optionally, the cylinder's load may be limited for a duration to reduce the likelihood of further pre-ignition. However, since the cylinder's spark plug is not degraded, cylinder combustion need not be limited at high loads. In still other examples, the cylinder pre-ignition may be addressed by shutting off fuel to the cylinder for a defined duration. In addition to the enrichment and load limiting, cylinder spark timing may be changed. In one example, the spark timing may be advanced by an amount, relative to the spark timing at the time of pre-ignition detection, towards MBT. In an alternate example, the spark timing may be retarded.

If the number and/or rate of misfires, as determined in the updated misfire count, is greater than the threshold at 206, and this is not followed by an occurrence of a cylinder pre-ignition event at 218, the routine may end. In comparison, if an occurrence of pre-ignition is confirmed at 218, then at 220, the cylinder pre-ignition count may be updated and at 222, it may be determined whether the updated cylinder pre-ignition is higher than a threshold count. For example, it may be determined whether a predefined number of pre-ignition events have occurred in that cylinder within a threshold duration. The threshold duration may include a threshold number of combustion events (such as, a threshold number of combustion events since the occurrence of misfire in that cylinder), or a threshold amount of time (such as, a threshold amount of time since the occurrence of misfire in that cylinder). If the number of cylinder pre-ignition events within the threshold duration is not greater than a threshold number of events (for example, if the cylinder pre-ignition count is lower than the threshold count), the routine may proceed to 212 to perform cylinder pre-ignition mitigating actions, such as by adjusting fuel injection to the cylinder based on the updated cylinder pre-ignition count.

If the cylinder pre-ignition count is higher than the threshold count, then at 223, spark-plug-induced pre-ignition may be determined. At 224, the routine may include indicating that the cylinder's spark plug is degraded in response to the number of misfires in the cylinder exceeding a threshold during the selected engine operating conditions and the number of cylinder pre-ignition events in the cylinder within the threshold duration being higher than a threshold. As such, the threshold settings for the cylinder misfire events and the cylinder pre-ignition events may be different. For example, spark plug degradation may be indicated in response to the number of misfires in the cylinder exceeding a first threshold during the selected engine operating conditions and the number of cylinder pre-ignition events in the cylinder within the threshold duration being higher than a second, different threshold. In one example, the second threshold may be higher than the first threshold.

In another example, spark plug degradation may be based on a pre-ignition number and rate, such as, based on a change in the occurrence of cylinder pre-ignition following the cylinder misfire event. For example, spark plug degradation may be indicated in response to a higher rate of cylinder pre-ignition occurrence following the cylinder misfire event, as compared to before the cylinder misfire event. As such, indicating spark plug degradation may include setting a diagnostic code, for example, by illuminating a malfunction indication light.

At 226, the routine further includes limiting (e.g., disabling) combustion in the given cylinder at high engine loads in response to the identification of spark plug degradation. Limiting combustion at high loads may include limiting an airflow to the given cylinder at high loads so that the cylinder cannot operate above a specified load (such as, a specified air mass level). In another example, limiting combustion may include disabling ignition in the cylinder at higher loads. As such, at high engine loads (that is, at high air and fuel mass), elevated cylinder temperatures can lead to heating of the degraded spark plug, and cause it to act like an ignition source (e.g., a glow plug). Thus, by limiting combustion in the affected cylinder at high engine loads, the occurrence of further cylinder misfire events and pre-ignition events due to an over-heated, degraded spark plug can be reduced.

In one example, wherein the engine includes a first and a second group of cylinders (or bank of cylinders), and the affected cylinder is included in the first group of cylinders, a cam timing of the first group of cylinders (but not the second group of cylinders) may be adjusted to limit an air flow (and thereby, an air mass) introduced therein. In alternate examples, one or more of a VVT, VCT, CVL, or CVVL mechanism may be adjusted to reduce the air mass introduced in the affected group of cylinders.

In still other embodiments, wherein each cylinder is equipped with port throttles and/or solenoid actuated valves (that is, camless systems), the port throttle and/or solenoid valve of the affected cylinder may be adjusted to enable load limiting of the affected cylinder only. For example, load-limiting the affected cylinder may include adjusting one or more of a cylinder port throttle, an electrically actuated intake valve of the cylinder, and an electrically actuated exhaust valve of the cylinder to limit an air flow to the cylinder. As such, in all cases, the load limiting may be continued for a threshold number of combustion events, or a predefined duration. Further, in some examples, after limiting combustion in the cylinder (or bank) in response to the indication of spark plug degradation, stoichiometric combustion may be maintained in the cylinder for at least a defined duration.

In other examples, as depicted, the routine may proceed to 212 to perform further cylinder pre-ignition mitigation by adjusting fuel injection to the cylinder based on the updated pre-ignition count. For example, as elaborated in FIG. 3, when the cylinder pre-ignition count exceeds the threshold number of events, the cylinder may be enriched for a threshold number of combustion events. The enrichment and/or duration of enrichment may be adjusted based on the number and/or rate of cylinder pre-ignition events. In one example, the mitigation may include enriching the cylinder for a first, larger duration when the number of cylinder pre-ignition events is higher than the second threshold, and enriching the cylinder for a second, smaller duration when the number of cylinder pre-ignition events is lower than the threshold. In another example, the mitigation may include enriching the cylinder by a first, larger amount when the number of cylinder pre-ignition events is higher than the threshold, and enriching the cylinder by a second, smaller amount when the number of cylinder pre-ignition events is lower than the threshold.

The pre-ignition mitigation may be further adjusted based on the updated misfire count. For example, the load of the cylinder may be limited more when the misfire count preceding the occurrence of cylinder pre-ignition is higher than a threshold, while the load of the cylinder is limited less when the misfire count preceding the occurrence of cylinder pre-ignition is higher than the threshold. Similarly, the cylinder enrichment may be increased (e.g., amount of enrichment, duration of enrichment) when the misfire count preceding the occurrence of cylinder pre-ignition is higher than a threshold, while the cylinder enrichment may be decreased when the misfire count preceding the occurrence of cylinder pre-ignition is lower than the threshold.

In this way, the occurrence of cylinder misfire events and cylinder pre-ignition events may be evaluated to identify degradation of a cylinder's spark plug. By inferring spark plug degradation in response to a cylinder misfire followed by a high occurrence of pre-ignition in the same cylinder, pre-ignition events caused by spark plug degradation can be more reliably identified and distinguished from pre-ignition events unrelated to spark plug degradation. By load-limiting a cylinder (that is, limiting cylinder combustion at high engine loads) in response to spark-plug-degradation-induced pre-ignition while enriching the cylinder in response to non-spark-plug-degradation-induced pre-ignition, the different pre-ignition events may be appropriately addressed. That is, different control mitigation actions may be taken in response to pre-ignition, depending on whether one or more misfire events have occurred in the cylinder within a certain duration of pre-ignition in that cylinder. By considering the interrelationship between pre-ignition with and without corresponding misfire events, it is possible to better coordinate the different control actions taken for spark-plug-induced pre-ignition (e.g., more restrictive load limiting) and non-spark-plug-induced pre-ignition (e.g., enrichment).

Now turning to FIG. 3, an example routine 300 is described for adjusting fuel injection in a cylinder in response to the occurrence of a pre-ignition event in the cylinder. In particular, a cylinder fuel injection profile is adjusted based on the cylinder's pre-ignition history including a number and rate of pre-ignition events in the cylinder.

At 302, the occurrence of a cylinder pre-ignition event is confirmed. If no cylinder pre-ignition has occurred, the routine may end. Upon confirmation, at 304, a cylinder pre-ignition count and a pre-ignition database (including details of previous pre-ignition events and pre-ignition mitigating operations in the given cylinder) may be updated. Updating the pre-ignition count and database may include, for example, increasing a pre-ignition count on a cylinder pre-ignition counter (or first pre-ignition rate counter). In addition to the cylinder pre-ignition count, an engine pre-ignition count and database may also be updated. The pre-ignition counts may include one or more of a cylinder trip pre-ignition count, a cylinder lifetime pre-ignition count, an engine trip pre-ignition count, an engine lifetime pre-ignition count, a cylinder consecutive pre-ignition count, and an engine consecutive pre-ignition count. The trip pre-ignition counts may be representative of previous pre-ignition events during the same engine cycle/operation, while the lifetime pre-ignition count may be representative of all previous pre-ignition events over the entire duration of vehicle operation.

In another example, the updated pre-ignition count may be representative of the number or pre-ignition events that have occurred over a threshold duration in a given cylinder since a previous cylinder misfire event (or since a threshold number of cylinder misfire events). It will be appreciated that while the depicted example includes increasing the pre-ignition count in response to an occurrence of pre-ignition (over a drive cycle, key cycle, predetermined amount of time, time since a previous misfire event, etc.), in alternate embodiments, increasing the pre-ignition count may include increasing the pre-ignition count based on a mileage of the engine (e.g., total mileage, mileage since the preceding misfire event in the cylinder, mileage since a preceding occurrence of pre-ignition in the cylinder, etc.).

At 306, a total number of cylinder pre-ignition events may be determined, such as, based on the updated pre-ignition count. At 308, a total number of consecutive cylinder pre-ignition events may be determined (such as, from a consecutive cylinder pre-ignition count). Herein, it may be determined as to how many of all the pre-ignition events that have occurred in the cylinder are consecutive, that is, the rate of pre-ignition occurrence in the cylinder may be determined. As such, the total pre-ignition count and the total consecutive pre-ignition count may be calculated from the preceding cylinder misfire event.

At 310, it may be determined whether the total number of cylinder pre-ignition events (or pre-ignition count) that have occurred over a threshold duration since a previous cylinder misfire event is greater than a threshold. If the total number of cylinder pre-ignition events is not greater than the threshold, then at 312, only the given cylinder may be enriched. The enrichment may be based on the pre-ignition count of the cylinder, for example, as the pre-ignition count increases, the given cylinder may be enriched by a larger amount and/or for a longer duration.

If the total number of cylinder pre-ignition events is greater than the threshold, then at 314, it may be determined whether the number of consecutive pre-ignition events in the cylinder is greater than a threshold. As such, the nature of the pre-ignition may be determined based on the number and rate of consecutive pre-ignition occurrence. In one example, when the number of consecutive pre-ignition events at 314 is greater than the threshold, persistent pre-ignition may be determined. That is, persistent pre-ignition may be concluded in response to a plurality of continuous, uninterrupted pre-ignition events over a plurality of consecutive cylinder combustion events since the preceding misfire event. In comparison, when the number of consecutive pre-ignition events at 314 is less than the threshold, while the total number of pre-ignition events at 310 is greater than a threshold, intermittent pre-ignition may be determined. That is, intermittent pre-ignition may be concluded in response to a plurality of discrete, interrupted pre-ignition events over a plurality of consecutive cylinder combustion events since the preceding misfire event.

In an alternate example, persistent pre-ignition may be determined in response to a continuous and steady increase in the pre-ignition count of the cylinder, while intermittent pre-ignition may be determined in response to a smaller increase in the cylinder pre-ignition count over the same duration following a preceding misfire event. In still another example, persistent pre-ignition may be determined in response to a pre-ignition combustion event on each combustion cycle, while intermittent pre-ignition may be determined in response to a pre-ignition combustion event on every other (or more) combustion cycles since the preceding misfire event. While the depicted example illustrates monitoring a cylinder pre-ignition count following a cylinder misfire event, in other examples, a rate of pre-ignition before and after the misfire event (e.g., an increase in the rate following the misfire event) may be monitored and the pre-ignition mitigation may be adjusted accordingly.

At 316, in response to the number of consecutive pre-ignition events in the cylinder being lower than the threshold (that is, intermittent pre-ignition), the load of the given cylinder may be limited by a smaller amount. For example, boost may be reduced by a (first) smaller amount, throttle opening may be reduced by a (first) smaller amount, or camshaft timing may be adjusted by a (first) smaller amount. Optionally, the load of the bank carrying the affected cylinder and/or the engine load may be limited by the (first) smaller amount. At 318, the given cylinder may be enriched by a smaller amount and/or for a shorter duration to reduce the occurrence of further pre-ignition events. Optionally, the bank carrying the affected cylinder and/or the engine may be enriched by the smaller amount and/or for the shorter duration.

In comparison, at 320, in response to the number of consecutive pre-ignition events in the cylinder being higher than the threshold (that is, persistent or runaway pre-ignition), the load of the given cylinder may be limited by a larger amount. For example, boost may be reduced by a (second) larger amount, throttle opening may be reduced by a (second) larger amount, or camshaft timing may be adjusted by a (second) larger amount. Optionally, the load of the bank carrying the affected cylinder and/or the engine load may be limited by the (second) larger amount. At 322, the given cylinder may be enriched by a larger amount and/or for a longer duration to reduce the occurrence of further pre-ignition events. Optionally, the bank carrying the affected cylinder and/or the engine may be enriched by the larger amount and/or for the longer duration.

The pre-ignition mitigation may also be varied based on whether the pre-ignition was spark-plug-degradation-induced or non-spark-plug-degradation-induced. As such, the spark-plug-degradation-induced pre-ignition may be identified based on an occurrence of misfire and pre-ignition in the cylinder within a duration, while the non-spark-plug-induced pre-ignition may be identified based on an occurrence of pre-ignition without misfire in the cylinder within the duration. In one example, in response to spark-plug-degradation-induced pre-ignition, the affected cylinder may be load-limited (in particular at higher loads) while in response to non-spark-plug-degradation-induced pre-ignition, the affected cylinder may be enriched and further the affected cylinder may be load limited.

In still other examples, the pre-ignition mitigation may be further adjusted based on the updated misfire count. For example, the load limiting and enrichment (of the affected cylinder or bank) may be increased by a larger amount when the occurrence of cylinder pre-ignition is preceded by a cylinder misfire or when the preceding cylinder misfire count is higher than a threshold, while the load limiting and enrichment (of the affected cylinder or bank) may be increased by a smaller amount when the cylinder pre-ignition is not preceded by a cylinder misfire or when the preceding cylinder misfire count is lower than the threshold.

As such, load limiting in response to pre-ignition may be continued until a (first) lower load threshold (e.g., a floating load limit) is reached. The lower load threshold may correspond to a load below which engine power and the vehicle operator's drive-feel may be reduced. During engine operating conditions wherein pre-ignition continues even after engine load has been limited to the lower load threshold, the pre-ignition count may be updated on an alternate (second) pre-ignition rate counter. If the pre-ignition count (or pre-ignition rate) exceeds the threshold of the second pre-ignition rate counter, load limiting may be continued beyond the first lower load threshold (i.e., the floating load limit) to a second failure lower load threshold, the second threshold being smaller (i.e. lower) than the first threshold, to protect the engine for at least that drive cycle. For example, load-limiting of the cylinder (or group of cylinders) may be performed based on a first cylinder pre-ignition count until a first load threshold is reached. Then, after the first load threshold is reached, load-limiting of the cylinder may be performed based on a second, different cylinder pre-ignition count until the second load threshold is reached.

As such, load limiting to the second lower threshold may reduce the engine power. Thus, before load limiting to the second lower threshold, an associated warning message may be delivered to the vehicle operator to warn them of the upcoming reduced power state (e.g., an associated diagnostic code or malfunction indication light may be set or illuminated). By reducing the engine power in response to pre-ignition continuing beyond the first load limiting, engine degradation from further pre-ignition may be reduced.

In this way, a relatively more aggressive approach to pre-ignition mitigation may be used when the cylinder pre-ignition is correlated with spark plug degradation while a relatively less aggressive approach may be used when the cylinder pre-ignition is not correlated with spark plug degradation, or other cylinder misfire events.

To further clarify the concepts introduced herein, example pre-ignition scenarios are described. In a first example, misfire may be detected in a cylinder during engine cold-start conditions and the cylinder misfire count may be updated. Within a defined duration following the detected cylinder misfire event, a threshold number of cylinder pre-ignition events may be detected in the same cylinder, and the cylinder's pre-ignition count may be updated. In response to the change in the number and/or rate of pre-ignition occurrence in the cylinder following the cylinder misfire event, the controller may determine that the pre-ignition events are at least in part correlated with the misfire event, and may indicate spark plug degradation in that cylinder. That is, the controller may determine that the pre-ignition is spark-plug-degradation induced. Additionally, to reduce the occurrence of further pre-ignition events in the cylinder caused by the degraded cylinder spark plug, the controller may limit combustion at high loads in the given cylinder. For example, the controller may disable ignition at high engine loads and/or reduce air flow to the given cylinder at high engine loads.

In a second example, a threshold number of cylinder pre-ignition events may be detected within the duration without any occurrence of misfire in the cylinder. Consequently, the controller may determine that the pre-ignition event is non-spark-plug-degradation induced and may take pre-ignition mitigating actions based at least upon the cylinder's pre-ignition count. For example, the cylinder may be enriched. Additionally, the affected cylinder may be load-limited.

In another example a method of controlling an engine cylinder including a spark plug comprises, indicating spark plug degradation in a cylinder based on a number and rate of cylinder pre-ignition events occurring after an occurrence of misfire in the cylinder. Spark plug degradation may be indicated by setting a diagnostic code. As such, a cylinder pre-ignition event may be determined based on a cylinder knock signal estimated in a first, earlier window being larger than a first, higher threshold, while a cylinder knock event may be determined based on the cylinder knock signal estimated in a second, later window being larger than a second, lower threshold. The method may further comprise, limiting operation of the engine cylinder at high engine loads in response to the indication of spark plug degradation, and enriching the cylinder for a threshold number of combustion events, the enrichment based on the number and rate of cylinder pre-ignition events.

In this way, by monitoring a cylinder's misfire count, and a change in the occurrence of pre-ignition in the cylinder following a misfire event, spark plug degradation may be reliably identified. By indicating degradation based on the cylinder misfire count and the cylinder pre-ignition count, pre-ignition events arising due to spark plug degradation may be better distinguished from those that are not due to spark plug issues. By limiting a cylinder load in response to the determination of spark plug degradation, and by addressing cylinder pre-ignition more aggressively when it follows a cylinder misfire event (or threshold number of misfire events during selected engine operating conditions), further cylinder pre-ignition events may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine cylinder including a spark plug, comprising: indicating spark plug degradation in a cylinder based on each of misfire and pre-ignition in the cylinder.

2. The method of claim 1, wherein the indication includes indicating spark plug degradation based on an occurrence of misfire in the cylinder and an occurrence of a number of pre-ignition events in that cylinder within a threshold duration.

3. The method of claim 2, wherein the threshold duration includes a threshold number of combustion events or a threshold amount of time.

4. The method of claim 2, wherein the occurrence of misfire includes an occurrence of a number of misfires in the cylinder during selected engine operating conditions.

5. The method of claim 4, wherein the selected engine operating conditions include engine cold-start conditions.

6. The method of claim 4, wherein the indication includes, indicating that the spark plug is degraded in response to the number of misfires in the cylinder exceeding a first threshold during the selected engine operating conditions and the number of cylinder pre-ignition events in the cylinder within the threshold duration being higher than a second, different threshold.

7. The method of claim 6, further comprising,
enriching the cylinder by a first, larger amount when the number of cylinder pre-ignition events are higher than the second threshold; and
enriching the cylinder by a second, smaller amount when the number of cylinder pre-ignition events are lower than the second threshold.

8. The method of claim 7, further comprising,
enriching the cylinder for a first, larger duration when the number of cylinder
pre-ignition events are higher than the second threshold; and
enriching the cylinder for a second, smaller duration when the number of cylinder pre-ignition events are lower than the second threshold.

9. The method of claim 6, further comprising, enriching the cylinder for a threshold number of combustion events when the number of cylinder pre-ignition events exceeds the second threshold.

10. The method of claim 1, wherein the misfire is based on one or more of an output of an exhaust gas oxygen sensor, crankshaft acceleration and spark plug ionization, and further wherein indicating spark plug degradation includes setting a diagnostic code.

11. The method of claim 1, further comprising limiting combustion in the cylinder at high engine loads in response to the indication of spark plug degradation.

12. An engine system, comprising:
an engine cylinder;
an ignition spark plug in the cylinder;
an exhaust gas oxygen sensor;
a knock sensor; and
a controller including computer readable instructions for:
indicating a misfire event in the cylinder based on an output of the exhaust gas oxygen sensor;
indicating a pre-ignition event in the cylinder based on an output of the knock sensor; and
indicating cylinder ignition spark plug degradation based on each of the cylinder misfire event and the pre-ignition event.

13. The system of claim 12, wherein the controller further includes instructions for disabling combustion in the cylinder at higher engine loads in response to the indication of cylinder ignition spark plug degradation.

14. The system of claim 12, wherein the controller further includes instructions for enriching the cylinder in response to the pre-ignition event, the enrichment adjusted based on a cylinder pre-ignition count.

* * * * *